United States Patent
Honda

(10) Patent No.: US 10,991,986 B2
(45) Date of Patent: Apr. 27, 2021

(54) BATTERY, BATTERY MANUFACTURING METHOD, AND BATTERY MANUFACTURING APPARATUS

(71) Applicant: PANASONIC INTELLECTUAL PROPERTY MANAGEMENT CO., LTD., Osaka (JP)

(72) Inventor: Kazuyoshi Honda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/506,882

(22) Filed: Jul. 9, 2019

(65) Prior Publication Data
US 2019/0334211 A1    Oct. 31, 2019

Related U.S. Application Data

(62) Division of application No. 15/485,791, filed on Apr. 12, 2017, now Pat. No. 10,396,402.

(30) Foreign Application Priority Data

Apr. 25, 2016   (JP) ................. 2016-086782

(51) Int. Cl.
*H01M 10/04*    (2006.01)
*H01M 10/0585*  (2010.01)
(Continued)

(52) U.S. Cl.
CPC ....... *H01M 10/0585* (2013.01); *H01M 4/525* (2013.01); *H01M 4/587* (2013.01);
(Continued)

(58) Field of Classification Search
None
See application file for complete search history.

(56) References Cited

U.S. PATENT DOCUMENTS

| 2004/0185336 A1* | 9/2004 | Ito ................ H01M 10/0525 |
| | | 429/152 |
| 2005/0284750 A1* | 12/2005 | Nishimura ........ H01M 10/4235 |
| | | 204/252 |

(Continued)

FOREIGN PATENT DOCUMENTS

| JP | 2000-195495 | 7/2000 |
| JP | 2013-105732 | 5/2013 |
| WO | 2016/031688 A1 | 3/2016 |

OTHER PUBLICATIONS

Notice of Allowance issued in U.S. Appl. No. 15/485,791, dated Apr. 10, 2019.

*Primary Examiner* — Scott J. Chmielecki
(74) *Attorney, Agent, or Firm* — McDermott Will and Emery LLP

(57) ABSTRACT

A battery includes first and second power generating elements laminated to each other. In the first power generating element, the inner layer of a first electrode current collector is in contact with a first electrode active material layer. In the second power generating element, the inner layer of a second electrode current collector is in contact with a second electrode active material layer. The outer layers of the first electrode current collector and the second electrode current collector are in contact with each other. The inner layer of the first electrode current collector contains a first material; the inner layer of the second electrode current collector contains a third material different from the first material; the outer layer of the second electrode current collector contains a second material different from the first material; and the outer layer of the first electrode current collector contains the second material.

6 Claims, 7 Drawing Sheets

(51) Int. Cl.
*H01M 4/66* (2006.01)
*H01M 4/525* (2010.01)
*H01M 4/587* (2010.01)
*H01M 4/62* (2006.01)
*H01M 10/0562* (2010.01)
*H01M 4/04* (2006.01)
*H01M 4/02* (2006.01)

(52) U.S. Cl.
CPC ........... *H01M 4/623* (2013.01); *H01M 4/625* (2013.01); *H01M 4/667* (2013.01); *H01M 10/044* (2013.01); *H01M 10/0404* (2013.01); *H01M 10/0418* (2013.01); *H01M 10/0562* (2013.01); *H01M 4/043* (2013.01); *H01M 4/0404* (2013.01); *H01M 2004/029* (2013.01); *H01M 2300/0068* (2013.01)

(56) References Cited

U.S. PATENT DOCUMENTS

| | | | | |
|---|---|---|---|---|
| 2006/0099493 | A1* | 5/2006 | Nishimura | H01M 10/42 429/62 |
| 2008/0318130 | A1* | 12/2008 | Ogawa | H01M 10/0525 429/231.95 |
| 2013/0122347 | A1* | 5/2013 | Horikawa | H01M 10/0436 429/144 |
| 2013/0309547 | A1* | 11/2013 | Bazzarella | H01M 10/0404 429/136 |
| 2014/0212751 | A1* | 7/2014 | Ku | H01M 10/0404 429/211 |
| 2014/0306665 | A1* | 10/2014 | Kim | H01M 4/043 320/128 |
| 2014/0308576 | A1* | 10/2014 | Gaben | H01M 4/0402 429/185 |
| 2017/0279113 | A1* | 9/2017 | Ohsawa | H01M 4/0404 |
| 2017/0331115 | A1* | 11/2017 | Saito | C08F 14/185 |
| 2018/0090766 | A1* | 3/2018 | Ohsawa | H01M 10/052 |
| 2018/0277816 | A1* | 9/2018 | Minagata | H01M 10/05 |

* cited by examiner

BATTERY, BATTERY MANUFACTURING METHOD, AND BATTERY MANUFACTURING APPARATUS

CROSS-REFERENCE OF RELATED APPLICATIONS

This application is a Divisional application of the U.S. patent application Ser. No. 15/485,791, filed on Apr. 12, 2017, which in turn claims the benefit of Japanese Application No. 2016-086782, filed on Apr. 25, 2016, the entire disclosures of which Applications are incorporated by reference herein.

BACKGROUND

Technical Field

The present disclosure relates to a battery, a battery manufacturing method, and battery manufacturing apparatus.

Description of the Related Art

Japanese Unexamined Patent Application Publication No. 2000-195495 discloses a sheet battery including a bipolar electrode unit composed of a composite current collector having a positive electrode current collector layer and a negative electrode current collector layer on both surfaces, respectively; a positive electrode active material layer on the positive electrode current collector layer; and a negative electrode active material layer on the negative electrode current collector layer.

SUMMARY

In known technologies, the reliability in connection between power generating elements cannot be enhanced.

In one general aspect, the techniques disclosed here feature a battery comprising a first power generating element and a second power generating element laminated to the first power generating element. The first power generating element includes a first electrode current collector including an inner layer and an outer layer, a first electrode active material layer, a first solid electrolyte layer, and a first counter electrode active material layer, where the first solid electrolyte layer is disposed between the first electrode active material layer and the first counter electrode active material layer, and the inner layer of the first electrode current collector is in contact with the first electrode active material layer. The second power generating element includes a second electrode current collector including an inner layer and an outer layer, a second electrode active material layer, a second solid electrolyte layer, and a second counter electrode active material layer, where the second solid electrolyte layer is disposed between the second electrode active material layer and the second counter electrode active material layer, and the inner layer of the second electrode current collector is in contact with the second electrode active material layer. The outer layer of the first electrode current collector and the outer layer of the second electrode current collector are in contact with each other. The inner layer of the first electrode current collector contains a first material; the inner layer of the second electrode current collector contains a third material different from the first material; the outer layer of the second electrode current collector contains a second material different from the first material; and the outer layer of the first electrode current collector contains the second material.

According to the present disclosure, the reliability in connection between power generating elements can be enhanced.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Embodiments of the present disclosure will now be described with reference to the drawings.

Embodiment 1

Figure 1:
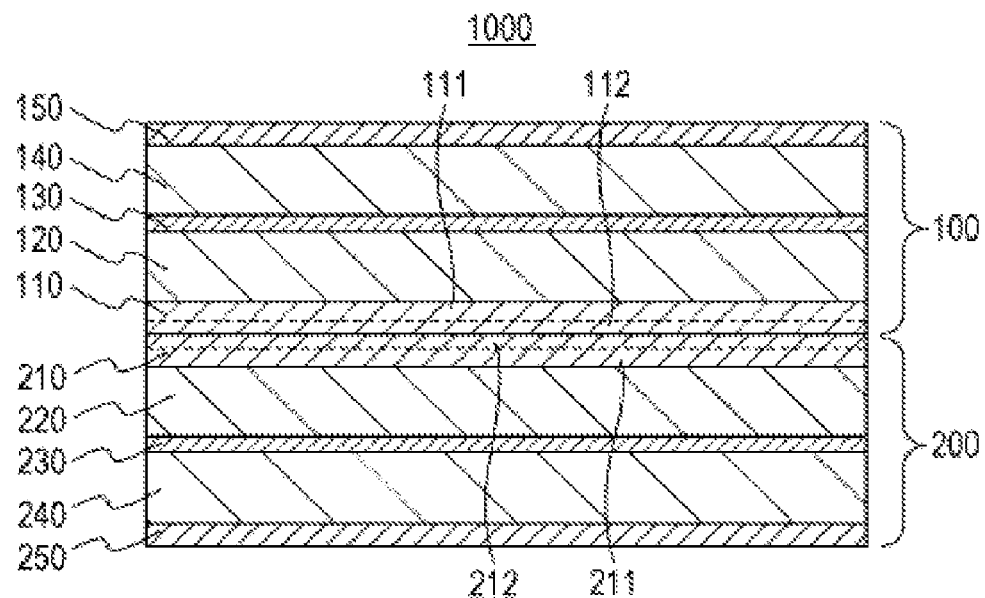
FIG. 1 is a cross-sectional view schematically illustrating the structure of a battery in Embodiment 1.

FIG. 1 is a cross-sectional view schematically illustrating the structure of a battery 1000 in Embodiment 1.

The battery 1000 in Embodiment 1 includes a first power generating element 100 and a second power generating element 200.

The first power generating element 100 and the second power generating element 200 are laminated to each other.

The first power generating element 100 includes a first electrode current collector 110 including an inner layer 111 and an outer layer 112, a first electrode active material layer 120, a first solid electrolyte layer 130, and a first counter electrode active material layer 140.

The first solid electrolyte layer 130 is disposed between the first electrode active material layer 120 and the first counter electrode active material layer 140.

The inner layer 111 of the first electrode current collector 110 is in contact with the first electrode active material layer 120.

The second power generating element 200 includes a second electrode current collector 210 including an inner layer 211 and an outer layer 212, a second electrode active material layer 220, a second solid electrolyte layer 230, and a second counter electrode active material layer 240.

The second solid electrolyte layer 230 is disposed between the second electrode active material layer 220 and the second counter electrode active material layer 240.

The inner layer 211 of the second electrode current collector 210 is in contact with the second electrode active material layer 220.

The outer layer 112 of the first electrode current collector 110 and the outer layer 212 of the second electrode current collector 210 are in contact with each other.

The inner layer 111 of the first electrode current collector 110 contains a first material. For example, the inner layer 111 of the first electrode current collector 110 consists of the first material or is mainly made of the first material.

The outer layer 212 of the second electrode current collector 210 contains a second material. For example, the outer layer 212 of the second electrode current collector 210 consists of the second material or is mainly made of the second material.

Herein, the second material is a material different from the first material. For example, the element constituting the second material is different from that constituting the first material.

The outer layer 112 of the first electrode current collector 110 contains the second material. For example, the outer layer 112 of the first electrode current collector 110 consists of the second material or is mainly made of the second material.

The structure described above can enhance the reliability in connection between the power generating elements. That is, occurrence of defects between the outer layer 112 of the first electrode current collector 110 and the outer layer 212 of the second electrode current collector 210 can be reduced by forming the outer layer 112 of the first electrode current collector 110 from the same second material as that of the outer layer 212 of the second electrode current collector 210. More specifically, for example, even if an environmental gas (e.g., a gaseous component remaining, penetrating, or occurring in a container accommodating a laminate of the first power generating element 100 and the second power generating element 200) invades into a minute void region between the outer layer 112 of the first electrode current collector 110 and the outer layer 212 of the second electrode current collector 210, occurrence of a minute potential difference or an ionization rate difference is prevented by forming the outer layer 112 of the first electrode current collector 110 and the outer layer 212 of the second electrode current collector 210 from the same second material. Accordingly, defects, such as a corrosion phenomenon, do not occur between the outer layer 112 of the first electrode current collector 110 and the outer layer 212 of the second electrode current collector 210, for example, even in use for a long time.

In the structure described above, as the first material, for example, a material suitable for electrical connection to the first electrode active material layer 120 can be used. In such a case, the outer layer 112 of the first electrode current collector 110 can be formed from the same second material as that of the outer layer 212 of the second electrode current collector 210, while providing good electrical connection between the inner layer 111 of the first electrode current collector 110 and the first electrode active material layer 120.

In addition, in the structure described above, the inner layer 111 and the outer layer 112 of the first electrode current collector 110 are integrated as one member (integral formation), and thereby no minute void region is formed between the inner layer 111 and the outer layer 112 of the first electrode current collector 110 (e.g., the inner layer 111 and the outer layer 112 of the first electrode current collector 110 tightly adhere to each other). Consequently, the environmental gas is prevented from penetrating between the inner layer 111 and the outer layer 112 of the first electrode current collector 110. As a result, defects, such as a corrosion phenomenon, are prevented from occurring even between the inner layer 111 and the outer layer 112, which are made of materials different from each other, of the first electrode current collector 110.

In the battery 1000 in Embodiment 1, the first power generating element 100 may further include a first counter electrode current collector 150.

The first counter electrode current collector 150 is in contact with the first counter electrode active material layer 140.

In the battery 1000 in Embodiment 1, the second power generating element 200 may further include a second counter electrode current collector 250.

The second counter electrode current collector 250 is in contact with the second counter electrode active material layer 240.

The first electrode active material layer 120 contains a first electrode active material.

The first counter electrode active material layer 140 contains a first counter electrode active material and is the counter electrode of the first electrode active material layer 120.

The second electrode active material layer 220 contains a second electrode active material.

The second counter electrode active material layer 240 contains a second counter electrode active material and is the counter electrode of the second electrode active material layer 220.

Herein, the first electrode active material layer 120 may be a positive electrode active material layer. In such a case, the first electrode active material is a positive electrode active material; the first electrode current collector 110 is a positive electrode current collector; the first counter electrode active material layer 140 is a negative electrode active material layer; the first counter electrode active material is a negative electrode active material; the first counter electrode current collector 150 is a negative electrode current collector; the second electrode current collector 210 is a negative electrode current collector; the second electrode active material layer 220 is a negative electrode active material layer; the second electrode active material is a negative electrode active material; the second counter electrode active material layer 240 is a positive electrode active material layer; the second counter electrode active material is a positive electrode active material; and the second counter electrode current collector 250 is a positive electrode current collector.

Alternatively, the first electrode active material layer 120 may be a negative electrode active material layer. In such a case, the first electrode active material is a negative electrode active material; the first electrode current collector 110 is a negative electrode current collector; the first counter electrode active material layer 140 is a positive electrode active material layer; the first counter electrode active material is a positive electrode active material; the first counter electrode current collector 150 is a positive electrode current collector; the second electrode current collector 210 is a positive electrode current collector; the second electrode active material layer 220 is a positive electrode active material layer; the second electrode active material is a positive electrode active material; the second counter electrode active material layer 240 is a negative electrode active material layer; the second counter electrode active material is a negative electrode active material; and the second counter electrode current collector 250 is a negative electrode current collector.

The first solid electrolyte layer 130 and the second solid electrolyte layer 230 each contain a solid electrolyte.

As the positive electrode current collector, for example, metal foil (e.g., stainless steel foil or Al foil) can be used. For example, when the first electrode current collector 110 is a positive electrode current collector, for example, stainless steel foil or aluminum (Al) can be used as the first material constituting the inner layer 111 of the first electrode current collector 110.

In addition, when the first electrode current collector 110 is a positive electrode current collector, for example, copper (Cu), platinum (Pt), nickel (Ni), or an alloy thereof can be used as the second material constituting the outer layer 112 of the first electrode current collector 110. The use of Pt, Ni, or an alloy thereof as the second material can enhance the corrosion resistance. Alternatively, the second material may be a material having high chemical resistance against an environment gas (e.g., $H_2S$ gas), which may be present in a small amount in the circumference of the power generating element. For example, the second material may be tantalum, gold, Inconel, or an alloy thereof.

As described above, a thin film layer (outer layer) containing a material to be used for the surface of the negative electrode current collector on the side on which the negative electrode active material layer is formed can be formed on the surface of the positive electrode current collector on the side on which the positive electrode active material is not formed.

The positive electrode current collector may have a thickness of, for example, 5 to 100 μm. The thin film layer (outer layer) of the positive electrode current collector may have a thickness of, for example, 0.5 to 5 μm. The outer layer of the positive electrode current collector may have a thickness smaller than that of the inner layer of the positive electrode current collector. Alternatively, the outer layer of the positive electrode current collector may have a thickness not smaller than that of the inner layer of the positive electrode current collector.

No thin film layer (outer layer) may be formed on the positive electrode current collector (e.g., the first counter electrode current collector 150, second counter electrode current collector 250, or third counter electrode current collector 350 described below) located at the uppermost or lowermost end of a stacked battery.

The positive electrode active material layer contains a positive electrode active material. As the positive electrode active material contained in the positive electrode active material layer, known positive electrode active materials (e.g., lithium cobalt oxide or LiNO) can be used. As the positive electrode active material, materials capable of releasing and adopting Li can be used.

As the material contained in the positive electrode active material layer, known solid electrolytes (e.g., inorganic solid electrolytes) can be used. Examples of the inorganic solid electrolyte include sulfide solid electrolytes and oxide solid electrolytes. For example, mixtures of $Li_2S$ and $P_2S_5$ can be used as the sulfide solid electrolyte. The surface of the positive electrode active material may be coated with a solid electrolyte. As the material contained in the positive electrode active material layer, for example, electrically conductive materials (e.g., acetylene black) and binder materials (e.g., poly(vinylidene fluoride)) can be used.

As the negative electrode current collector, for example, metal foil (e.g., stainless steel foil or Cu foil) can be used. For example, when the first electrode current collector 110 is a negative electrode current collector, for example, stainless steel foil or copper (Cu) can be used as the first material constituting the inner layer 111 of the first electrode current collector 110.

In addition, when the first electrode current collector 110 is a negative electrode current collector, for example, aluminum (Al), platinum (Pt), nickel (Ni), or an alloy thereof can be used as the second material constituting the outer layer 112 of first electrode current collector 110. The use of Pt, Ni, or an alloy thereof as the second material can enhance the corrosion resistance. Alternatively, the second material may be a material having high chemical resistance against an environment gas (e.g., $H_2S$ gas), which may be present in a small amount in the circumference of the power generating element. For example, the second material may be tantalum, gold, Inconel, or an alloy thereof.

As described above, a thin film layer (outer layer) containing a material to be used for the surface of the positive electrode current collector on the side on which the positive electrode active material layer is formed can be formed on the surface of the negative electrode current collector on the side on which the negative electrode active material is not formed.

If the second material has high resistance to, for example, the environmental gas, the current collectors of the first power generating element 100 and the second power generating element 200 can be prevented from deteriorating during the manufacturing or storage of the first power generating element 100 and the second power generating element 200. That is, the current collector of the battery 1000 can be prevented from deteriorating during the manufacturing or storage of the battery 1000 by providing a layer of the second material having high resistance to corrosion as the outer layer of the current collector disposed on the outermost side of the battery 1000.

The negative electrode current collector may have a thickness of, for example, 5 to 100 μm. The thin film layer (outer layer) of the negative electrode current collector may have a thickness of, for example, 0.5 to 5 μm. The outer layer of the negative electrode current collector may have a thickness smaller than that of the inner layer of the negative electrode current collector. Alternatively, the outer layer of the negative electrode current collector may have a thickness not smaller than that of the inner layer of the negative electrode current collector.

No thin film layer (outer layer) may be formed on the negative electrode current collector (e.g., the first counter electrode current collector 150, second counter electrode current collector 250, or third counter electrode current collector 350 described below) located at the uppermost or lowermost end of a stacked battery.

The negative electrode active material layer contains a negative electrode active material. As the negative electrode active material contained in the negative electrode active material layer, known negative electrode active materials (e.g., graphite) can be used. Materials capable of releasing and adopting Li can be used as the negative electrode active material.

As the material contained in the negative electrode active material layer, known solid electrolytes (e.g., inorganic solid electrolytes) can be used. Examples of the inorganic solid electrolyte include sulfide solid electrolytes and oxide solid electrolytes. For example, mixtures of $Li_2S$ and $P_2S_5$ can be used as the sulfide solid electrolyte. As the material contained in the negative electrode active material layer, for example, electrically conductive materials (e.g., acetylene black) and binder materials (e.g., poly(vinylidene fluoride)) can be used.

In the power generating element, as shown in FIG. 1, the range for forming the negative electrode active material layer may be larger than that for forming the positive electrode active material layer, which leads to an opportunity of preventing defects (e.g., a reduction in reliability) of the battery, for example, due to precipitation of lithium.

Alternatively, in the power generating element, the ranges for forming the positive electrode active material layer and the negative electrode active material layer may be the same.

The solid electrolyte layer contains a solid electrolyte. As the solid electrolyte contained in the solid electrolyte layer, known solid electrolytes (e.g., inorganic solid electrolytes) can be used. Examples of the inorganic solid electrolyte include sulfide solid electrolytes and oxide solid electrolytes. For example, mixtures of $Li_2S$ and $P_2S_5$ can be used as the sulfide solid electrolyte.

As the material contained in the solid electrolyte layer, for example, binder materials (e.g., poly(vinylidene fluoride)) can be used.

In the power generating element, the solid electrolyte layer may have an area larger than those of the positive electrode active material layer and the negative electrode active material layer. In such a case, a short circuit due to a direct contact between the positive electrode layer and the negative electrode layer can be prevented.

In the power generating element, the range for forming the solid electrolyte layer may be the same as that for forming the positive electrode current collector or the negative electrode current collector.

Alternatively, in the power generating element, the range for forming the solid electrolyte layer may be smaller than that for forming the positive electrode current collector or the negative electrode current collector. In such a case, for example, when the current collector is cut into a predetermined shape, occurrence of cracking or partial detachment in the solid electrolyte layer can be reduced. In addition, occurrence of cutting scraps and occurrence of cutting powder during the cutting can be reduced.

In the battery 1000 in Embodiment 1, the inner layer 211 of the second electrode current collector 210 may contain a third material. For example, the inner layer 211 of the second electrode current collector 210 may consist of the third material or may be mainly made of the third material.

In such a case, the third material may be different from the first material.

In the structure described above, as the first and the third materials, materials suitable for electrical connection to the respective active material layers can be used. That is, as the first material, for example, a material suitable for electrical connection to the first electrode active material layer 120 can be used; and as the third material, for example, a material suitable for electrical connection to the second electrode active material layer 220 can be used. In such a case, the outer layer 212 of the second electrode current collector 210 can be formed from the same second material as that of the outer layer 112 of the first electrode current collector 110, while providing good electrical connection between the inner layer 111 of the first electrode current collector 110 and the first electrode active material layer 120 and good electrical connection between the inner layer 211 of the second electrode current collector 210 and the second electrode active material layer 220.

When the first electrode current collector 110 is a positive electrode current collector (i.e., when the second electrode current collector 210 is a negative electrode current collector), for example, aluminum (Al) can be used as the first material. In such a case, for example, copper (Cu) can be used as the third material. Either one of the first material and the third material may be stainless steel.

Alternatively, when the first electrode current collector 110 is a negative electrode current collector (i.e., when the second electrode current collector 210 is a positive electrode current collector), for example, copper (Cu) can be used as the first material. In such a case, for example, aluminum (Al) can be used as the third material. Either one of the first material and the third material may be stainless steel.

In the battery 1000 in Embodiment 1, the inner layer 211 of the second electrode current collector 210 may contain a second material. For example, the inner layer 211 of the second electrode current collector 210 may consist of the second material or may be mainly made of the second material.

That is, the inner layer 211 and the outer layer 212 of the second electrode current collector 210 may be made of the same material (second material). In other words, the third material and the second material may be the same material. For example, the element constituting the third material may be the same as that constituting the second material.

In the structure described above, it is possible to omit the step of forming two layers made of different materials in the second electrode current collector 210. Accordingly, the process of producing the second electrode current collector 210 can be facilitated.

Alternatively, in the battery 1000 in Embodiment 1, the third material may be different from the second material. For example, the element constituting the third material may be different from that constituting the second material.

In the structure described above, as the third material, for example, a material suitable for electrical connection to the second electrode active material layer 220 can be used. In such a case, the outer layer 212 of the second electrode current collector 210 can be formed from the same second material as that of the outer layer 112 of the first electrode current collector 110, while providing good electrical connection between the inner layer 211 of the second electrode current collector 210 and the second electrode active material layer 220.

In the structure described above, the inner layer 211 and the outer layer 212 of the second electrode current collector 210 are integrated as one member (integral formation), and thereby no minute void region is formed between the inner layer 211 and the outer layer 212 of the second electrode current collector 210 (e.g., the inner layer 211 and the outer layer 212 of the second electrode current collector 210 tightly adhere to each other). Consequently, the environmental gas is prevented from penetrating between the inner layer 211 and the outer layer 212 of the second electrode current collector 210. As a result, defects, such as a corrosion phenomenon, are prevented from occurring even between the inner layer 211 and the outer layer 212, which are made of materials different from each other, of the second electrode current collector 210.

Figure 2:
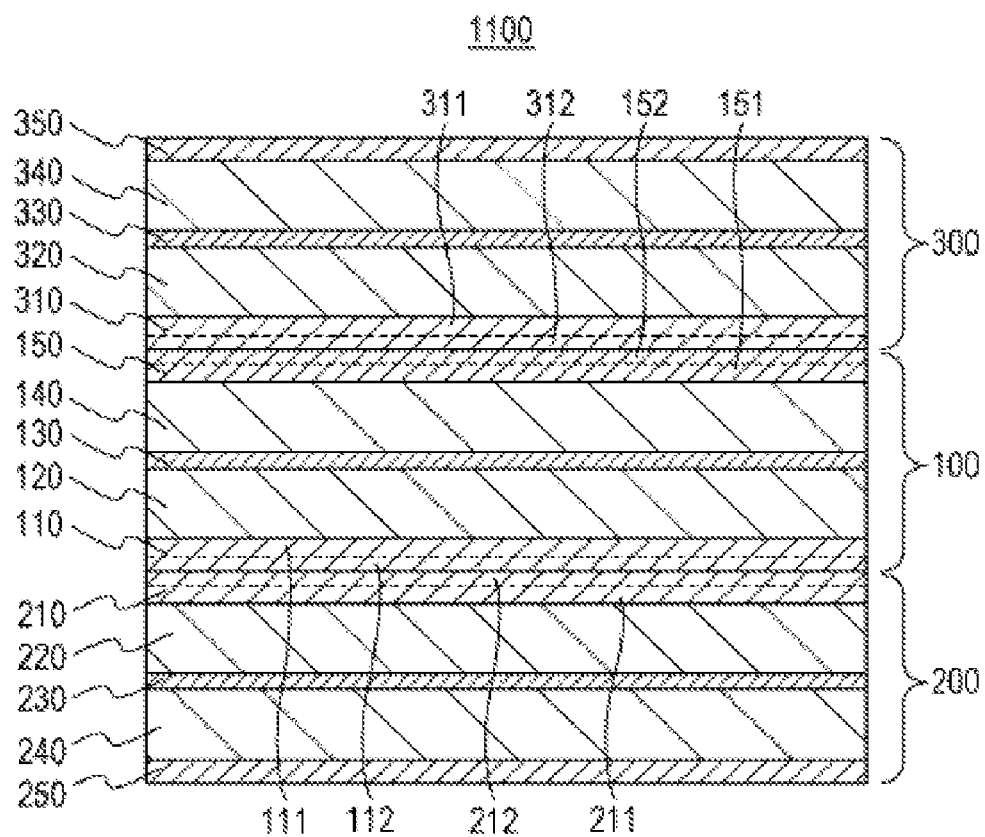
FIG. 2 is a cross-sectional view schematically illustrating the structure of another battery in Embodiment 1.

FIG. 2 is a cross-sectional view schematically illustrating the structure of a battery 1100 in Embodiment 1.

The battery 1100 in Embodiment 1 further includes the following structure in addition to the structure of the battery 1000 in Embodiment 1.

That is, the battery 1100 in Embodiment 1 further includes a third power generating element 300.

The first power generating element 100 and the third power generating element 300 are laminated to each other.

The third power generating element 300 includes a third electrode current collector 310 including an inner layer 311 and an outer layer 312, a third electrode active material layer 320, a third solid electrolyte layer 330, and a third counter electrode active material layer 340.

The third solid electrolyte layer 330 is disposed between the third electrode active material layer 320 and the third counter electrode active material layer 340.

The inner layer 311 of the third electrode current collector 310 is in contact with the third electrode active material layer 320.

The first power generating element 100 further includes a first counter electrode current collector 150.

The inner layer 151 of the first counter electrode current collector 150 is in contact with the first counter electrode active material layer 140.

The outer layer 152 of the first counter electrode current collector 150 and the outer layer 312 of the third electrode current collector 310 are in contact with each other.

The inner layer 311 of the third electrode current collector 310 contains a fourth material. For example, the inner layer 311 of the third electrode current collector 310 consists of the fourth material or is mainly made of the fourth material.

The outer layer 152 of the first counter electrode current collector 150 contains a fifth material. For example, the outer layer 152 of the first counter electrode current collector 150 consists of the fifth material or is mainly made of the fifth material.

Herein, the fifth material is a material different from the fourth material. For example, the element constituting the fifth material is different from that constituting the fourth material.

The outer layer 312 of the third electrode current collector 310 contains a fifth material. For example, the outer layer 312 of the third electrode current collector 310 consists of the fifth material or is mainly made of the fifth material.

The structure described above can further enhance the reliability in connection between the power generating elements. That is, occurrence of defects between the outer layer 312 of the third electrode current collector 310 and the outer layer 152 of the first counter electrode current collector 150 can be reduced by forming the outer layer 312 of the third electrode current collector 310 and the outer layer 152 of the first counter electrode current collector 150 from the same fifth material. More specifically, for example, even if an environmental gas (e.g., a gaseous component remaining, penetrating, or occurring in a container accommodating a laminate of the first power generating element 100, the second power generating element 200, and the third power generating element 300) invades into a minute void region between the outer layer 312 of the third electrode current collector 310 and the outer layer 152 of the first counter electrode current collector 150, occurrence of a minute potential difference or an ionization rate difference is prevented by forming the outer layer 312 of the third electrode current collector 310 and the outer layer 152 of the first counter electrode current collector 150 from the same fifth material. Accordingly, defects, such as a corrosion phenomenon, do not occur between the outer layer 312 of the third electrode current collector 310 and the outer layer 152 of the first counter electrode current collector 150, for example, even in use for a long time.

In the structure described above, as the fourth material, for example, a material suitable for electrical connection to the third electrode active material layer 320 can be used. In such a case, the outer layer 312 of the third electrode current collector 310 can be formed from the same fifth material as that of the outer layer 152 of the first counter electrode current collector 150, while providing good electrical connection between the inner layer 311 of the third electrode current collector 310 and the third electrode active material layer 320.

In the structure described above, the inner layer 311 and the outer layer 312 of the third electrode current collector 310 are integrated as one member (integral formation), and thereby no minute void region is formed between the inner layer 311 and the outer layer 312 of the third electrode current collector 310 (e.g., the inner layer 311 and the outer layer 312 of the third electrode current collector 310 tightly adhere to each other). As a result, the environmental gas is prevented from penetrating between the inner layer 311 and the outer layer 312 of the third electrode current collector 310. As a result, defects, such as a corrosion phenomenon, are prevented from occurring even between the inner layer 311 and the outer layer 312, which are made of materials different from each other, of the third electrode current collector 310.

In the battery 1100 in Embodiment 1, the third power generating element 300 may further include a third counter electrode current collector 350.

The third counter electrode current collector 350 is in contact with the third counter electrode active material layer 340.

The third electrode active material layer 320 contains a third electrode active material.

The third counter electrode active material layer 340 contains a third counter electrode active material and is the counter electrode of the third electrode active material layer 320.

The third solid electrolyte layer 330 contains a solid electrolyte.

Herein, when the first electrode active material layer 120 is a positive electrode active material layer, the first counter electrode active material layer 140 is a negative electrode active material layer, and the first counter electrode current collector 150 is a negative electrode current collector. In such a case, the third electrode current collector 310 is a positive electrode current collector; the third electrode active material layer 320 is a positive electrode active material layer; the third electrode active material is a positive electrode active material; the third counter electrode active material layer 340 is a negative electrode active material layer; the third counter electrode active material is a negative electrode active material; and the third counter electrode current collector 350 is a negative electrode current collector.

When the third electrode current collector 310 is a positive electrode current collector, for example, stainless steel foil or aluminum (Al) can be used as the fourth material constituting the inner layer 311 of the third electrode current collector 310.

When the third electrode current collector 310 is a positive electrode current collector, for example, Cu, Pt, Ni, or an alloy thereof can be used as the fifth material constituting the outer layer 312 of the third electrode current collector 310. The use of Pt, Ni, or an alloy thereof as the fifth material can enhance the corrosion resistance. Alternatively, the fifth material may be a material having high chemical resistance against an environment gas (e.g., $H_2S$ gas), which may be present in a small amount in the circumference of the power generating element. For example, the fifth material may be tantalum, gold, Inconel, or an alloy thereof.

Alternatively, when the first electrode active material layer 120 is a negative electrode active material layer, the first counter electrode active material layer 140 is a positive electrode active material layer, and the first counter electrode current collector 150 is a positive electrode current collector. In such a case, the third electrode current collector 310 is a negative electrode current collector; the third electrode active material layer 320 is a negative electrode active material layer; the third electrode active material is a negative electrode active material; the third counter electrode active material layer 340 is a positive electrode active material layer; the third counter electrode active material is a positive electrode active material; and the third counter electrode current collector 350 is a positive electrode current collector.

When the third electrode current collector 310 is a negative electrode current collector, for example, stainless steel foil or Cu can be used as the fourth material constituting the inner layer 311 of the third electrode current collector 310.

When the third electrode current collector 310 is a negative electrode current collector, for example, Al, Pt, Ni, or an alloy thereof can be used as the fifth material constituting the outer layer 312 of third electrode current collector 310. The use of Pt, Ni, or an alloy thereof as the fifth material can enhance the corrosion resistance. Alternatively, the fifth material may be a material having high chemical resistance against an environment gas (e.g., $H_2S$ gas), which may be present in a small amount in the circumference of the power generating element. For example, the fifth material may be tantalum, gold, Inconel, or an alloy thereof.

If the fifth material has high resistance to, for example, the environmental gas, the current collectors of the first power generating element 100 and the third power generating element 300 can be prevented from deteriorating during the manufacturing or storage of the first power generating element 100 and the third power generating element 300. That is, the current collectors of the battery 1100 can be prevented from deteriorating during the manufacturing or storage of the battery 1100 by providing a layer of the fifth material having high corrosion resistance as the outer layer of the current collector disposed on the outermost side of the battery 1100.

In the battery 1100 in Embodiment 1, the inner layer 151 of the first counter electrode current collector 150 may contain a sixth material. For example, the inner layer 151 of the first counter electrode current collector 150 may consist of the sixth material or may be mainly made of the sixth material.

In such a case, the sixth material may be different from the fourth material.

In the structure described above, as the fourth and the sixth materials, materials suitable for electrical connection to the respective active material layers can be used. That is, as the fourth material, for example, a material suitable for electrical connection to the third electrode active material layer 320 can be used; and as the sixth material, for example, a material suitable for electrical connection to the first counter electrode active material layer 140 can be used. In such a case, the outer layer 312 of the third electrode current collector 310 can be made of the same fifth material as that of the outer layer 152 of the first counter electrode current collector 150, while providing good electrical connection between the inner layer 311 of the third electrode current collector 310 and the third electrode active material layer 320 and good electrical connection between the inner layer 151 of the first counter electrode current collector 150 and the first counter electrode active material layer 140.

When the third electrode current collector 310 is a positive electrode current collector (i.e., when the first counter electrode current collector 150 is a negative electrode current collector), for example, aluminum (Al) can be used as the fourth material. In such a case, for example, copper (Cu) can be used as the sixth material. Either one of the fourth material and the sixth material may be stainless steel.

Alternatively, when the third electrode current collector 310 is a negative electrode current collector (i.e., when the first counter electrode current collector 150 is a positive electrode current collector), for example, copper (Cu) can be used as the fourth material. In such a case, for example, aluminum (Al) can be used as the sixth material. Either one of the fourth material and the sixth material may be stainless steel.

In the battery 1100 in Embodiment 1, the inner layer 151 of the first counter electrode current collector 150 may contain a fifth material. For example, the inner layer 151 of the first counter electrode current collector 150 may consist of the fifth material or may be mainly made of the fifth material.

That is, the inner layer 151 and the outer layer 152 of the first counter electrode current collector 150 may be made of the same material (fifth material). In other words, the sixth material and the fifth material may be the same material. For example, the element constituting the sixth material may be the same as that constituting the fifth material.

In the structure described above, it is possible to omit the step of forming two layers made of different materials in the first counter electrode current collector 150. Accordingly, the process of producing the first counter electrode current collector 150 can be facilitated.

Alternatively, in the battery 1100 in Embodiment 1, the sixth material may be different from the fifth material. For example, the element constituting the sixth material may be different from that constituting the fifth material.

In the structure described above, as the sixth material, for example, a material suitable for electrical connection to the first counter electrode active material layer 140 can be used. In such a case, the outer layer 152 of the first counter electrode current collector 150 can be made of the same fifth material as that of the outer layer 312 of the third electrode current collector 310, while providing good electrical connection between the inner layer 151 of the first counter electrode current collector 150 and the first counter electrode active material layer 140.

The inner layer 151 and the outer layer 152 of the first counter electrode current collector 150 are integrated as one member (integral formation), and thereby no minute void region is formed between the inner layer 151 and the outer layer 152 of the first counter electrode current collector 150 (e.g., the inner layer 151 and the outer layer 152 of the first counter electrode current collector 150 tightly adhere to each other). As a result, the environmental gas is prevented from penetrating between the inner layer 151 and the outer layer 152 of the first counter electrode current collector 150. As a result, defects, such as a corrosion phenomenon, are prevented from occurring even between the inner layer 151 and the outer layer 152, which are made of materials different from each other, of the first counter electrode current collector 150.

The first solid electrolyte layer 130, the second solid electrolyte layer 230, and the third solid electrolyte layer 330 may have the same structure (e.g., thickness or formed area) and be made of the same material.

The first electrode active material layer 120, the second counter electrode active material layer 240, and the third electrode active material layer 320 may have the same structure (e.g., thickness or formed area) and be made of the same material.

The first counter electrode active material layer 140, the second electrode active material layer 220, and the third counter electrode active material layer 340 may have the same structure (e.g., thickness or formed area) and be made of the same material.

The first electrode current collector 110 and the third electrode current collector 310 may have the same structure (e.g., thickness or formed area) and be made of the same material.

More specifically, for example, the first material constituting the inner layer 111 of the first electrode current collector 110 and the fourth material constituting the inner layer 311 of the third electrode current collector 310 may be the same material.

The first counter electrode current collector 150 and the second electrode current collector 210 may have the same structure (e.g., thickness or formed area) and be made of the same material.

More specifically, for example, the third material constituting the inner layer 211 of the second electrode current collector 210 and the sixth material constituting the inner layer 151 of the first counter electrode current collector 150 may be the same material.

The second material constituting the outer layer 112 of the first electrode current collector 110 and the outer layer 212 of the second electrode current collector 210 and the fifth material constituting the outer layer 152 of the first counter electrode current collector 150 and the outer layer 312 of the third electrode current collector 310 may be the same material.

In Embodiment 1, as described above, in two single battery elements opposing to each other, the main component of the surface material of the positive electrode current collector of one single battery element (power generating element) is the same as the main component of the surface material of the negative electrode current collector of the other single battery element. For example, in stacking of single battery elements, the surface materials of opposing current collectors are the same. More specifically, the second material constituting the outer layer 212 of the second electrode current collector 210 is the same material as the second material constituting the outer layer 112 of the first electrode current collector 110. For example, a layer (common layer) containing a common element (common interface layer material) as the main component is disposed on the surfaces of opposing current collectors.

The structure of Embodiment 1 can lighten the weight of the battery. Thar is, a current collector can be formed by using a material having a low density (e.g., Al) for the core (inner layer) and a material having a high density for a thin film (outer layer) on the surface of the core. As a result, the weight of the current collector can be reduced, compared with the case of forming the whole current collector (both the inner layer and the outer layer) from only a material having a high density. Accordingly, it is possible to reduce the weight of a battery composed of a plurality of laminated single battery elements (a plurality of current collectors).

The method of producing the battery in Embodiment 1 will be described as Embodiment 2 below.

Embodiment 2

Embodiment 2 will now be described. The explanation duplicated with Embodiment 1 is appropriately omitted.

Figure 3:
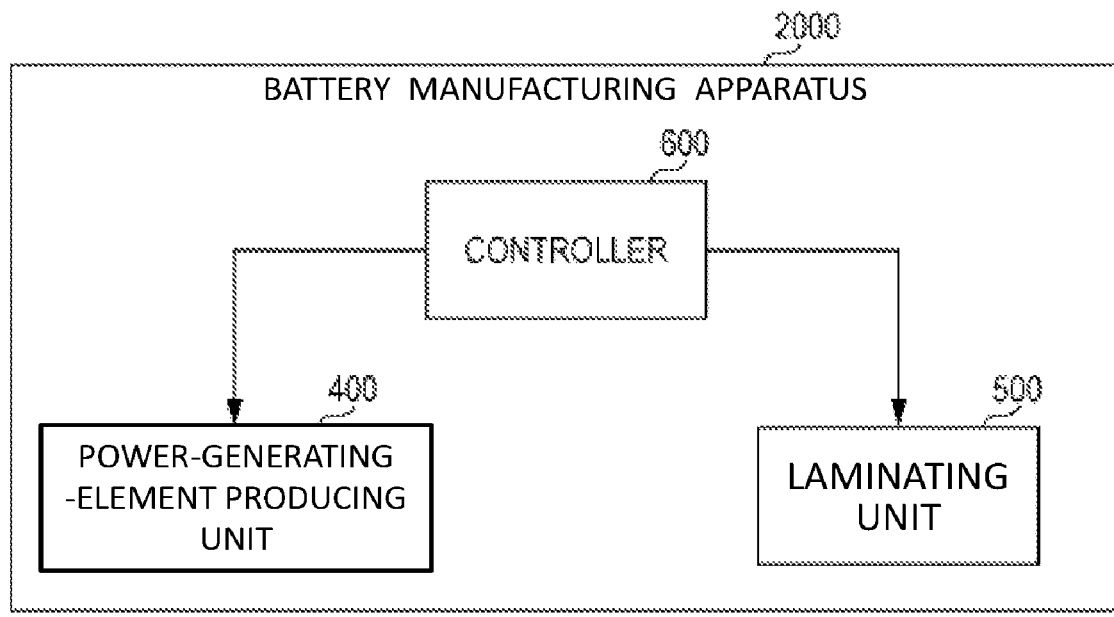
FIG. 3 is a diagram schematically illustrating the structure of battery manufacturing apparatus in Embodiment 2.

FIG. 3 is a diagram schematically illustrating the structure of battery manufacturing apparatus 2000 in Embodiment 2.

The battery manufacturing apparatus 2000 in Embodiment 2 includes a power-generating-element producing unit 400 and a laminating unit 500.

The power-generating-element producing unit 400 produces a first power generating element 100 and a second power generating element 200.

The power-generating-element producing unit 400 forms a first solid electrolyte layer 130 between a first electrode active material layer 120 and a first counter electrode active material layer 140.

The power-generating-element producing unit 400 forms a first electrode current collector 110 such that the inner layer 111 thereof is in contact with the first electrode active material layer 120.

The power-generating-element producing unit 400 forms the inner layer 111 of the first electrode current collector 110 from a material containing a first material (e.g., the first material itself or a material mainly composed of the first material).

The power-generating-element producing unit 400 forms the outer layer 112 of the first electrode current collector 110 from a material containing a second material (e.g., the second material itself or a material mainly composed of the second material).

Herein, the second material is a material different from the first material. For example, the element constituting the second material is different from that constituting the first material.

The power-generating-element producing unit 400 forms a second solid electrolyte layer 230 between a second electrode active material layer 220 and a second counter electrode active material layer 240.

The power-generating-element producing unit 400 forms a second electrode current collector 210 such that the inner layer 211 thereof is in contact with the second electrode active material layer 220.

The power-generating-element producing unit 400 forms the outer layer 212 of the second electrode current collector 210 from a material containing a second material (e.g., the second material itself or a material mainly composed of the second material).

The laminating unit 500 laminates the first power generating element 100 and the second power generating element 200 produced by the power-generating-element producing unit 400.

The laminating unit 500 arranges the first power generating element 100 and the second power generating element 200 such that the outer layer 112 of the first electrode current collector 110 and the outer layer 212 of the second electrode current collector 210 are in contact with each other.

Figure 4:
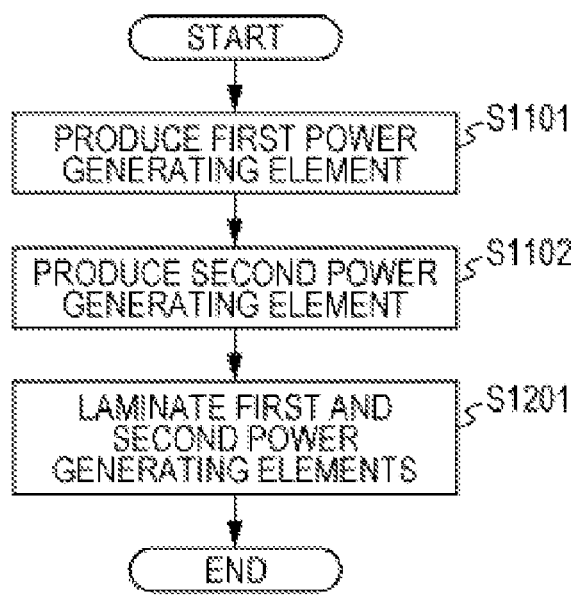
FIG. 4 is a flow chart showing a battery manufacturing method in Embodiment 2.

FIG. 4 is a flow chart showing a battery manufacturing method in Embodiment 2.

The battery manufacturing method in Embodiment 2 uses the battery manufacturing apparatus 2000 in Embodiment 2. For example, the battery manufacturing method in Embodiment 2 is carried out with the battery manufacturing apparatus 2000 in Embodiment 2.

The battery manufacturing method in Embodiment 2 includes a first power generating element-producing step S1101 (Step (a1)), a second power generating element-producing step S1102 (Step (a2)), and a first and second power generating elements-laminating step S1201 (Step (b)).

The first power generating element-producing step S1101 is a step of producing a first power generating element 100 with the power-generating-element producing unit 400.

In the first power generating element-producing step S1101, the power-generating-element producing unit 400 forms a first solid electrolyte layer 130 between a first electrode active material layer 120 and a first counter electrode active material layer 140.

In the first power generating element-producing step S1101, the power-generating-element producing unit 400 forms a first electrode current collector 110 such that the inner layer 111 thereof is in contact with the first electrode active material layer 120.

In the first power generating element-producing step S1101, the power-generating-element producing unit 400 forms the inner layer 111 of the first electrode current collector 110 from a material containing a first material (e.g., the first material itself or a material mainly composed of the first material).

In the first power generating element-producing step S1101, the power-generating-element producing unit 400 forms the outer layer 112 of the first electrode current collector 110 from a material containing a second material (e.g., the second material itself or a material mainly composed of the second material).

Herein, the second material is a material different from the first material. For example, the element constituting the second material is different from that constituting the first material.

The second power generating element-producing step S1102 is a step of producing a second power generating element 200 with the power-generating-element producing unit 400.

In the second power generating element-producing step S1102, the power-generating-element producing unit 400 forms a second solid electrolyte layer 230 between a second electrode active material layer 220 and a second counter electrode active material layer 240.

In the second power generating element-producing step S1102, the power-generating-element producing unit 400 forms a second electrode current collector 210 such that the inner layer 211 thereof is in contact with the second electrode active material layer 220.

In the second power generating element-producing step S1102, the power-generating-element producing unit 400 forms the outer layer 212 of the second electrode current collector 210 from a material containing a second material (e.g., the second material itself or a material mainly composed of the second material).

The first and second power generating elements-laminating step S1201 is a step of laminating, with the laminating unit 500, the first power generating element 100 and the second power generating element 200 produced with the power-generating-element producing unit 400.

The first and second power generating elements-laminating step S1201 is carried out later than the first power generating element-producing step S1101 and the second power generating element-producing step S1102.

In the first and second power generating elements-laminating step S1201, the laminating unit 500 arranges the first power generating element 100 and the second power generating element 200 such that the outer layer 112 of the first electrode current collector 110 and the outer layer 212 of the second electrode current collector 210 are in contact with each other.

The battery 1000 in Embodiment 1 can be produced with the apparatus or by the method described above.

The apparatus or the method described above can produce a battery with an enhanced reliability in connection between power generating elements while preventing a decrease in manufacturing yield. That is, the manufacturing process can be simplified and facilitated by producing a first power generating element 100 and a second power generating element 200 and then laminating (e.g., arranging in series) the first power generating element 100 and the second power generating element 200. As a result, a reduction in manufacturing yield due to complication of the manufacturing process can be prevented.

The apparatus or the method described above also can enhance the reliability in connection between the power generating elements. That is, occurrence of defects between the outer layer 112 of the first electrode current collector 110 and the outer layer 212 of the second electrode current collector 210 can be reduced by forming the outer layer 112 of the first electrode current collector 110 from the same second material as that of the outer layer 212 of the second electrode current collector 210. More specifically, for example, even if an environmental gas (e.g., a gaseous component remaining, penetrating, or occurring in a container accommodating a laminate of the first power generating element 100 and the second power generating element 200) invades into a minute void region between the outer layer 112 of the first electrode current collector 110 and the outer layer 212 of the second electrode current collector 210, occurrence of a minute potential difference or an ionization rate difference is prevented by forming the outer layer 112 of the first electrode current collector 110 and the outer layer 212 of the second electrode current collector 210 from the same second material. Accordingly, defects, such as a corrosion phenomenon, do not occur between the outer layer 112 of the first electrode current collector 110 and the outer layer 212 of the second electrode current collector 210, for example, even in use for a long time.

In addition, in the use of the apparatus or the method described above, as the first material, for example, a material suitable for electrical connection to the first electrode active material layer 120 can be used. In such a case, the outer layer 112 of the first electrode current collector 110 can be formed from the same second material as that of the outer layer 212 of the second electrode current collector 210, while providing good electrical connection between the inner layer 111 of the first electrode current collector 110 and the first electrode active material layer 120.

In the use of the apparatus or the method described above, the inner layer 111 and the outer layer 112 of the first electrode current collector 110 are integrated as one member (integral formation), and thereby no minute void region is formed between the inner layer 111 and the outer layer 112 of the first electrode current collector 110 (e.g., the inner layer 111 and the outer layer 112 of the first electrode current collector 110 tightly adhere to each other). Consequently, the environmental gas is prevented from penetrating between the inner layer 111 and the outer layer 112 of the first electrode current collector 110. As a result, defects, such as a corrosion phenomenon, are prevented from occurring even between the inner layer 111 and the outer layer 112, which are made of materials different from each other, of the first electrode current collector 110.

In the battery manufacturing apparatus 2000 in Embodiment 2, the power-generating-element producing unit 400 may form the inner layer 211 of the second electrode current collector 210 from a material containing a third material (e.g., the third material itself or a material mainly composed of the third material).

In other words, in the battery manufacturing method in Embodiment 2, in the second power generating element-producing step S1102, the power-generating-element producing unit 400 may form the inner layer 211 of the second electrode current collector 210 from a material containing a third material (e.g., the third material itself or a material mainly composed of the third material).

In such a case, the third material may be different from the first material.

In the structure described above, as the first and the third materials, materials suitable for electrical connection to the respective active material layers can be used. That is, as the first material, for example, a material suitable for electrical connection to the first electrode active material layer 120 can be used; and as the third material, for example, a material suitable for electrical connection to the second electrode active material layer 220 can be used. In such a case, the outer layer 212 of the second electrode current collector 210 can be formed from the same second material as that of the outer layer 112 of the first electrode current collector 110, while providing good electrical connection between the inner layer 111 of the first electrode current collector 110 and the first electrode active material layer 120 and good electrical connection between the inner layer 211 of the second electrode current collector 210 and the second electrode active material layer 220.

In Embodiment 2, the third material may be the same material as the second material. For example, the element constituting the third material may be the same as that constituting the second material.

In the structure described above, it is possible to omit the step of forming two layers made of different materials in the second electrode current collector 210. Accordingly, the process of producing the second electrode current collector 210 can be facilitated.

In Embodiment 2, the third material may be different from the second material. For example, the element constituting the third material may be different from that constituting the second material.

In the use of the apparatus or the method described above, as the third material, for example, a material suitable for electrical connection to the second electrode active material layer 220 can be used. In such a case, the outer layer 212 of the second electrode current collector 210 can be formed from the same second material as that of the outer layer 112 of the first electrode current collector 110, while providing good electrical connection between the inner layer 211 of the second electrode current collector 210 and the second electrode active material layer 220.

In the use of the apparatus or the method described above, the inner layer 211 and the outer layer 212 of the second electrode current collector 210 are integrated as one member (integral formation), and thereby no minute void region is formed between the inner layer 211 and the outer layer 212 of the second electrode current collector 210 (e.g., the inner layer 211 and the outer layer 212 of the second electrode current collector 210 tightly adhere to each other). Consequently, the environmental gas is prevented from penetrating between the inner layer 211 and the outer layer 212 of the second electrode current collector 210. As a result, defects, such as a corrosion phenomenon, are prevented from occurring even between the inner layer 211 and the outer layer 212, which are made of materials different from each other, of the second electrode current collector 210.

Figure 5:
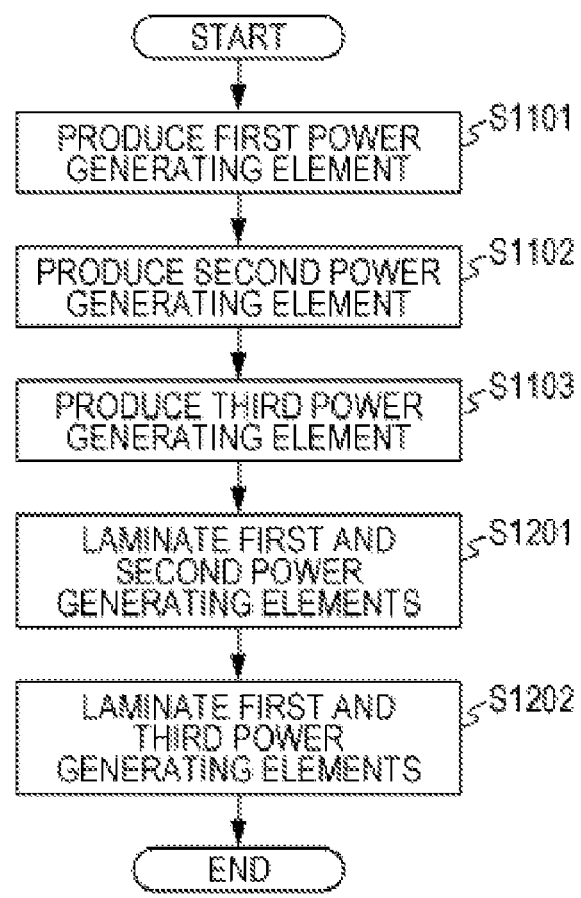
FIG. 5 is a flow chart showing a modification of the battery manufacturing method in Embodiment 2.

FIG. 5 is a flow chart showing a modification of the battery manufacturing method in Embodiment 2.

In the battery manufacturing apparatus 2000 in Embodiment 2, the power-generating-element producing unit 400 may produce a third power generating element 300.

In such a case, the power-generating-element producing unit 400 forms a third solid electrolyte layer 330 between a third electrode active material layer 320 and a third counter electrode active material layer 340.

The power-generating-element producing unit 400 forms a third electrode current collector 310 such that the inner layer 311 thereof is in contact with the third electrode active material layer 320.

The power-generating-element producing unit 400 forms the inner layer 311 of the third electrode current collector 310 from a material containing a fourth material (e.g., the fourth material itself or a material mainly composed of the fourth material).

The power-generating-element producing unit 400 forms the outer layer 312 of the third electrode current collector 310 from a material containing a fifth material (e.g., the fifth material itself or a material mainly composed of the fifth material).

Herein, the fifth material is a material different from the fourth material. For example, the element constituting the fifth material is different from that constituting the fourth material.

The power-generating-element producing unit 400 forms a first counter electrode current collector 150 such that the inner layer 151 thereof is in contact with a first counter electrode active material layer 140.

The power-generating-element producing unit 400 forms the outer layer 152 of the first counter electrode current collector 150 from a material containing a fifth material (e.g., the fifth material itself or a material mainly composed of the fifth material).

In the battery manufacturing apparatus 2000 in Embodiment 2, the laminating unit 500 may laminate the first power generating element 100 and the third power generating element 300 produced with the power-generating-element producing unit 400.

In such a case, the laminating unit 500 arranges the first power generating element 100 and the third power generating element 300 such that the outer layer 152 of the first counter electrode current collector 150 and the outer layer 312 of the third electrode current collector 310 are in contact with each other.

In other words, the battery manufacturing method in Embodiment 2 further includes a third power generating element-producing step S1103 (Step (a3)) and a first and third power generating elements-laminating step S1202 (Step (c)).

The third power generating element-producing step S1103 is a step of producing a third power generating element 300 with the power-generating-element producing unit 400.

In the third power generating element-producing step S1103, the power-generating-element producing unit 400 forms a third solid electrolyte layer 330 between a third electrode active material layer 320 and a third counter electrode active material layer 340.

In the third power generating element-producing step S1103, the power-generating-element producing unit 400 forms a third electrode current collector 310 such that the inner layer 311 thereof is in contact with the third electrode active material layer 320.

In the third power generating element-producing step S1103, the power-generating-element producing unit 400 forms the inner layer 311 of the third electrode current collector 310 from a material containing a fourth material (e.g., the fourth material itself of a material mainly composed of the fourth material).

In the third power generating element-producing step S1103, the power-generating-element producing unit 400 forms the outer layer 312 of the third electrode current collector 310 from a material containing a fifth material (e.g., the fifth material itself or a material mainly composed of the fifth material).

In such a case, the fifth material is a material different from the fourth material. For example, the element constituting the fifth material is different from that constituting the fourth material.

In the first power generating element-producing step S1101, the power-generating-element producing unit 400 forms a first counter electrode current collector 150 such that the inner layer 151 thereof is in contact with the first counter electrode active material layer 140.

In the first power generating element-producing step S1101, the power-generating-element producing unit 400 forms the outer layer 152 of the first counter electrode current collector 150 from a material containing a fifth material (e.g., the fifth material itself or a material mainly composed of the fifth material).

In the first and third power generating elements-laminating step S1202, the laminating unit 500 laminates the first power generating element 100 and the third power generating element 300 produced with the power-generating-element producing unit 400.

The first and third power generating elements-laminating step S1202 is carried out later than the first power generating element-producing step S1101 and the third power generating element-producing step S1103.

In the first and third power generating elements-laminating step S1202, the laminating unit 500 arranges the first power generating element 100 and the third power generating element 300 such that the outer layer 152 of the first counter electrode current collector 150 and the outer layer 312 of the third electrode current collector 310 are in contact with each other.

The apparatus or the method described above can produce the battery 1100 in Embodiment 1.

The apparatus or the method described above can produce a battery with an enhanced reliability in connection between power generating elements while preventing a decrease in manufacturing yield. That is, the manufacturing process can be simplified and facilitated by producing a first power generating element, a second power generating element, and a third power generating element and then laminating (e.g., arranging in series) the first power generating element, the second power generating element, and the third power generating element. As a result, a reduction in manufacturing yield due to complication of the manufacturing process can be further prevented.

The apparatus or the method described above can further enhance the reliability in connection between power generating elements. That is, occurrence of defects between the outer layer 312 of the third electrode current collector 310 and the outer layer 152 of the first counter electrode current collector 150 can be reduced by forming the outer layer 312 of the third electrode current collector 110 from the same fifth material as that of the outer layer 152 of the first counter electrode current collector 150. More specifically, for example, even if an environmental gas (e.g., a gaseous component remaining, penetrating, or occurring in a container accommodating a laminate of the first power generating element 100, the second power generating element 200, and the third power generating element 300) invades into a minute void region between the outer layer 312 of the third electrode current collector 310 and the outer layer 152 of the first counter electrode current collector 150, occurrence of a minute potential difference or an ionization rate difference is prevented by forming the outer layer 312 of the third electrode current collector 310 and the outer layer 152 of the first counter electrode current collector 150 from the same fifth material. Accordingly, defects, such as a corrosion phenomenon, do not occur between the outer layer 312 of the third electrode current collector 310 and the outer layer 152 of the first counter electrode current collector 150, for example, even in use for a long time.

In addition, in the use of the apparatus or the method described above, as the fourth material, for example, a material suitable for electrical connection to the third electrode active material layer 320 can be used. In such a case, the outer layer 312 of the third electrode current collector 310 can be formed from the same fifth material as that of the outer layer 152 of first electrode current collector 150, while providing good electrical connection between the inner layer 311 of the third electrode current collector 310 and the third electrode active material layer 320.

In the use of the apparatus or the method described above, the inner layer 311 and the outer layer 312 of the third electrode current collector 310 are integrated as one member (integral formation), and thereby no minute void region is formed between the inner layer 311 and the outer layer 312 of the third electrode current collector 310 (e.g., the inner layer 311 and the outer layer 312 of the third electrode current collector 310 tightly adhere to each other). Consequently, the environmental gas is prevented from penetrating between the inner layer 311 and the outer layer 312 of the third electrode current collector 310. As a result, defects, such as a corrosion phenomenon, are prevented from occurring even between the inner layer 311 and the outer layer 312, which are made of materials different from each other, of the third electrode current collector 310.

In the battery manufacturing apparatus 2000 in Embodiment 2, the power-generating-element producing unit 400 may form the inner layer 151 of the first counter electrode current collector 150 from a material containing a sixth material (e.g., the sixth material itself or a material mainly composed of the sixth material).

In other words, in the battery manufacturing method in Embodiment 2, in the first power generating element-producing step S1101, the power-generating-element producing unit 400 may form the inner layer 151 of the first counter electrode current collector 150 from a material containing a sixth material (e.g., the sixth material itself or a material mainly composed of the sixth material).

In such a case, the sixth material may be a material different from the fourth material.

In the structure described above, as the fourth and the sixth materials, materials suitable for electrical connection to the respective active material layers can be used. That is, as the fourth material, for example, a material suitable for electrical connection to the third electrode active material layer 320 can be used; and as the sixth material, for example, a material suitable for electrical connection to the first counter electrode active material layer 140 can be used. In such a case, the outer layer 312 of the third electrode current collector 310 can be made of the same fifth material as that of the outer layer 152 of the first counter electrode current collector 150, while providing good electrical connection between the inner layer 311 of the third electrode current collector 310 and the third electrode active material layer 320 and good electrical connection between the inner layer 151 of the first counter electrode current collector 150 and the first counter electrode active material layer 140.

In Embodiment 2, the sixth material may be the same material as the fifth material. For example, the element constituting the sixth material may be the same as that constituting the fifth material.

In the structure described above, it is possible to omit the step of forming two layers made of different materials in the first counter electrode current collector 150. Accordingly, the process of producing the first counter electrode current collector 150 can be facilitated.

In Embodiment 2, the sixth material may be a material different from the fifth material. For example, the element constituting the sixth material may be different from that constituting the fifth material.

In the use of the apparatus or the method described above, as the sixth material, for example, a material suitable for electrical connection to the first counter electrode active material layer 140 can be used. In such a case, the outer layer 152 of the first counter electrode current collector 150 can be formed from the same fifth material as that of the outer layer 312 of the third electrode current collector 310, while providing good electrical connection between the inner layer 151 of the first counter electrode current collector 150 and the first counter electrode active material layer 140.

In the use of the apparatus or the method described above, the inner layer 151 and the outer layer 152 of the first counter electrode current collector 150 are integrated as one member (integral formation), and thereby no minute void region is formed between the inner layer 151 and the outer layer 152 of the first counter electrode current collector 150 (e.g., the inner layer 151 and the outer layer 152 of the first counter electrode current collector 150 tightly adhere to each other). Consequently, the environmental gas is prevented from penetrating between the inner layer 151 and the outer layer 152 of the first counter electrode current collector 150. As a result, defects, such as a corrosion phenomenon, are prevented from occurring even between the inner layer 151 and the outer layer 152, which are made of materials different from each other, of the first counter electrode current collector 150.

In Embodiment 2, the power-generating-element producing unit 400 may include a coating mechanism for coating, for example, an active material or a solid electrolyte as the coating agent. The power-generating-element producing unit 400 may further include, for example, a discharge mechanism (e.g., a discharge port) for discharging a coating agent, a supply mechanism (e.g., a tank and a supply pipe) for supplying the coating agent to the discharge mechanism, and a transfer mechanism (e.g., a roller) for transferring, for example, a current collector as a coating target.

In Embodiment 2, the power-generating-element producing unit 400 may include an outer layer-forming mechanism for forming a thin film layer (outer layer) on a current collector. The outer layer-forming mechanism may include a mechanism for performing a wet process (e.g., plating), a mechanism for performing a dry process (e.g., vapor deposition or sputtering), a mechanism for performing a bonding process (e.g., clad foil molding), or a mechanism for performing thermal spraying or coating. For example, the outer layer-forming mechanism may include, for example, an application mechanism (e.g., a discharge port) for applying a thin film layer material (outer layer material) to a current collector substrate, a supply mechanism (e.g., a tank and a supply pipe) for supplying the thin film layer material to the application mechanism, a transfer mechanism (e.g., a roller) for transferring the current collector substrate as an application target, and another mechanism.

In Embodiment 2, the laminating unit 500 may include, for example, a transfer mechanism (e.g., a roller) for transferring each power generating element as a lamination target.

The battery manufacturing apparatus 2000 in Embodiment 2 may include a pressing unit pressing each power generating element (or a laminate of power generating elements). The pressing unit may include a pressing mechanism (e.g., a press table and a cylinder) for performing pressure compression of each power generating element (or a laminate of power generating elements), a transfer mechanism (e.g., a roller) for transferring each power generating element (or a laminate of power generating elements) as a pressing object, and another mechanism.

As the mechanisms that are encompassed in the power-generating-element producing unit 400, the laminating unit 500, and the pressing unit, generally known devices and members can be appropriately used.

As shown in FIG. 3, the battery manufacturing apparatus 2000 in Embodiment 2 may further include a controller 600.

The controller 600 controls the operation of the power-generating-element producing unit 400, the laminating unit 500, and the pressing unit.

The controller 600 may be composed of, for example, a processor and a memory. The processor may be, for example, a central processing unit (CPU) or a micro-processing unit (MPU). In such a case, the processor may read out and implement the program stored in the memory and thereby control the method (battery manufacturing method) shown by the present disclosure.

In Embodiment 2, the first power generating element 100, the second power generating element 200, and the third power generating element 300 may be produced in any order. For example, the first power generating element-producing step S1101, the second power generating element-producing step S1102, and the third power generating element-producing step S1103 may be carried out at the same time.

In Embodiment 2, the first and third power generating elements-laminating step S1202 may be carried out first, and then the first and second power generating elements-laminating step S1201 may be carried out.

An example of the battery manufacturing method in Embodiment 2 will now be described.

Figure 6:
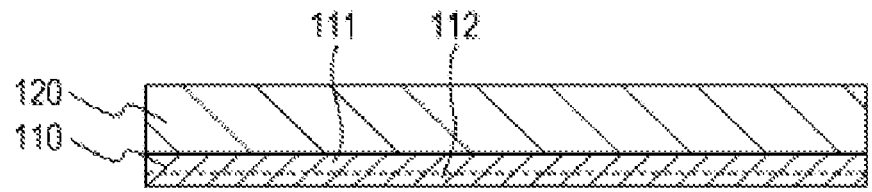
FIG. 6 is a cross-sectional view schematically illustrating the structure of members constituting a first power generating element in a manufacturing process.

FIG. 6 is a cross-sectional view schematically illustrating the structure of members constituting a first power generating element 100 in a manufacturing process.

A first electrode current collector 110 is produced first. That is, the power-generating-element producing unit 400 forms a thin film layer containing a second material on one surface of a substrate containing a first material for the first electrode current collector 110. As a result, as shown in FIG. 6, the thin film layer is formed as the outer layer 112 of the first electrode current collector 110. As shown in FIG. 6, the other surface (on the side on which the thin film layer is not formed) of the substrate functions as the inner layer 111 of the first electrode current collector 110.

The thin film layer can be formed by, for example, a wet process (e.g., plating), a dry process (e.g., vapor deposition or sputtering), a bonding process (e.g., clad foil molding), or another process (e.g., thermal spraying or coating).

Then, as shown in FIG. 6, a first electrode active material layer 120 is formed on the first electrode current collector 110. That is, the power-generating-element producing unit 400 applies a paint in a paste form, prepared by kneading the material for the first electrode active material layer 120 with a solvent, onto the first electrode current collector 110, followed by drying to produce a first electrode active material layer 120. In order to increase the density of the first electrode active material layer 120, the members shown in FIG. 6 may be pressed (pressure compression) after the drying. The thus-produced first electrode active material layer 120 has a thickness of, for example, 5 to 300 μm.

Figure 7:
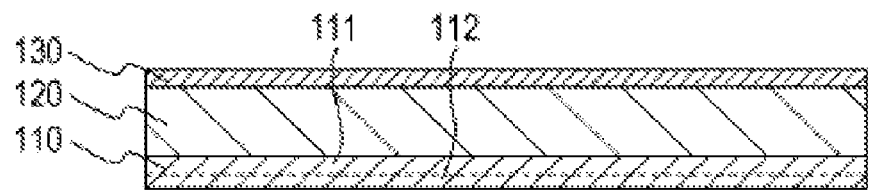
FIG. 7 is a cross-sectional view schematically illustrating the structure of members constituting a first power generating element in a manufacturing process.

FIG. 7 is a cross-sectional view schematically illustrating the structure of members constituting a first power generating element 100 in a manufacturing process.

As shown in FIG. 7, a first solid electrolyte layer 130 is formed on the first electrode active material layer 120. That is, the power-generating-element producing unit 400 applies a paint in a paste form, prepared by kneading the material for the first solid electrolyte layer 130 with a solvent, onto the first electrode active material layer 120, followed by drying to produce a first solid electrolyte layer 130.

Figure 8:
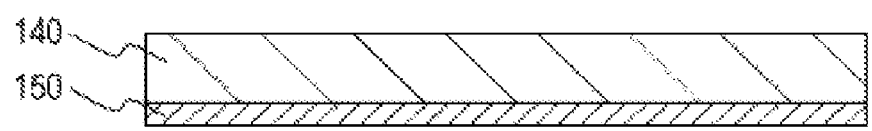
FIG. 8 is a cross-sectional view schematically illustrating the structure of members constituting a first power generating element in a manufacturing process.

FIG. 8 is a cross-sectional view schematically illustrating the structure of members constituting a first power generating element 100 in a manufacturing process.

As shown in FIG. 8, a first counter electrode active material layer 140 is formed on a first counter electrode current collector 150 containing a second material. That is, the power-generating-element producing unit 400 applies a paint in a paste form, prepared by kneading the material for the first counter electrode active material layer 140 with a solvent, onto the first counter electrode current collector 150, followed by drying to produce the first counter electrode active material layer 140. In order to increase the density of the first counter electrode active material layer 140, the members shown in FIG. 8 may be pressed (pressure compression). The thus-produced first counter electrode active material layer 140 has a thickness, for example, 5 to 300 μm.

Figure 9:
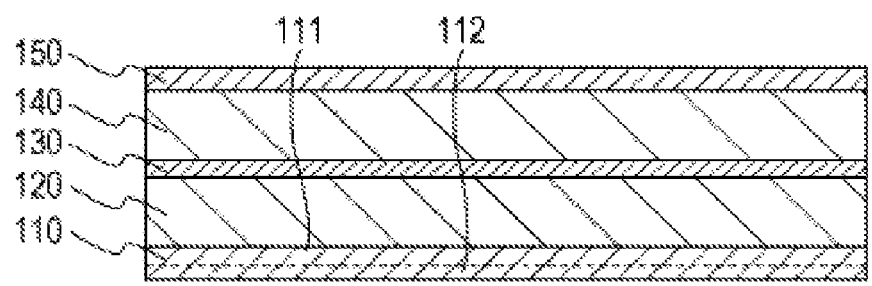
FIG. 9 is a cross-sectional view schematically illustrating the structure of a first power generating element.

FIG. 9 is a cross-sectional view schematically illustrating the structure of a first power generating element 100.

As shown in FIG. 9, the power-generating-element producing unit 400 stacks the electrode plate shown in FIG. 7 composed of a first electrode active material layer 120 and a first solid electrolyte layer 130 formed thereon and the counter electrode plate shown in FIG. 8 such that the first electrode active material layer 120 and the first counter electrode active material layer 140 oppose to each other with the first solid electrolyte layer 130 therebetween to produce a first power generating element 100.

Alternatively, the first power generating element 100 may be produced by forming a first solid electrolyte layer 130 on the first counter electrode active material layer 140 shown in FIG. 8 to form a counter electrode plate and stacking the resulting counter electrode plate and the electrode plate shown in FIG. 6 with the power-generating-element producing unit 400 such that the first electrode active material layer 120 and the first counter electrode active material layer 140 oppose to each other with first solid electrolyte layer 130 therebetween.

The first power generating element 100 shown in FIG. 9 may be further pressed (pressure compression). The pressure compression makes each layer dense and gives a good state of bonding between the layers. The bonding may be performed such that the cross-sectional width of the positive electrode active material layer does not protrude from the cross-sectional width of the opposing negative electrode active material layer.

In the manufacturing process described above, layers of the first power generating element 100 may be formed in any order. Each layer of the first power generating element 100 may be formed by any method, such as sequential lamination, sticking, transcription, or a combination thereof.

A second power generating element 200 and a third power generating element 300 can be produced as in the first power generating element 100.

Figure 10:
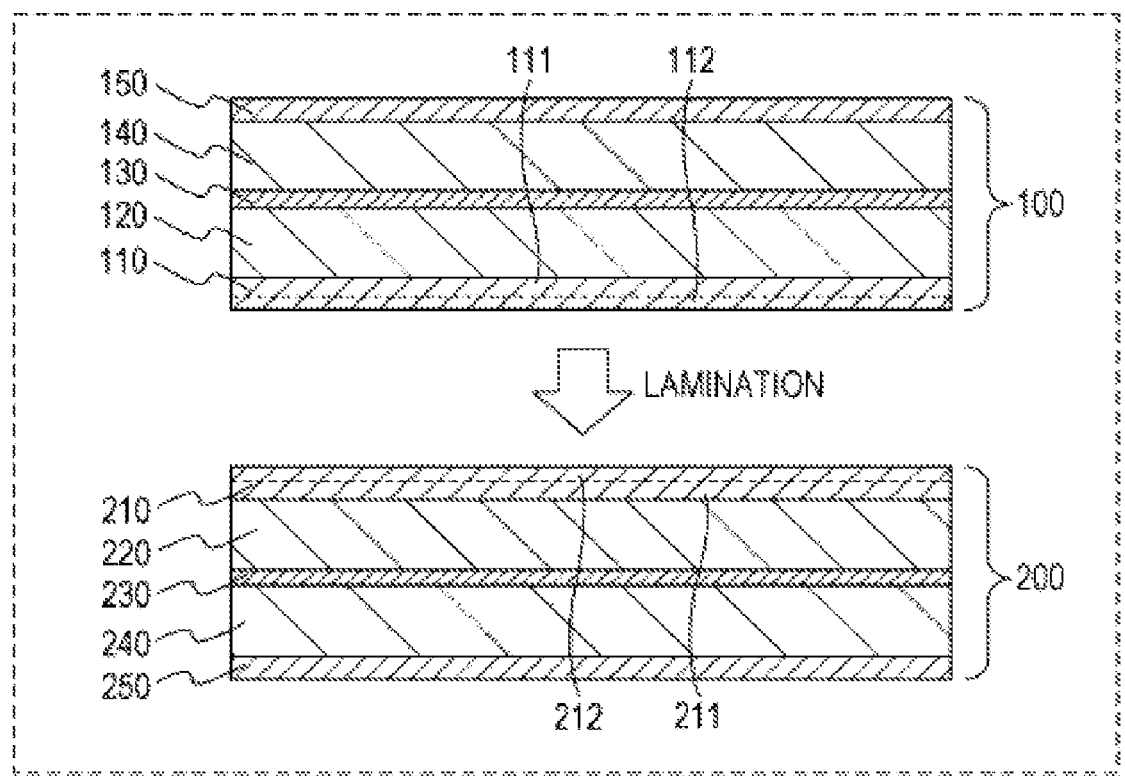
FIG. 10 is cross-sectional views showing a process of laminating a first power generating element and a second power generating element.

FIG. 10 is cross-sectional views showing a step of laminating a first power generating element 100 and a second power generating element 200.

As shown in FIG. 10, the laminating unit 500 laminates a first power generating element 100 having the structure shown in FIG. 9 and a second power generating element 200 produced so as to have the structure shown in FIG. 9. For example, the first power generating element 100 is stacked on the second power generating element 200. In such a case, the laminating unit 500 arranges the first power generating element 100 and the second power generating element 200 such that the outer layer 112 of the first electrode current collector 110 and the outer layer 212 of the second electrode current collector 210 are in contact with each other.

The method described above can produce, for example, the battery 1000 shown in FIG. 1.

Figure 11:
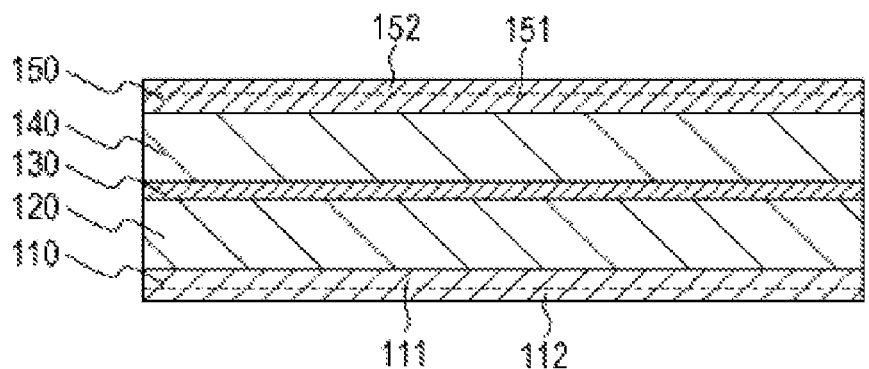
FIG. 11 is a cross-sectional view schematically illustrating the structure of a first power generating element.

FIG. 11 is a cross-sectional view schematically illustrating the structure of a first power generating element 100.

As shown in FIG. 11, the first power generating element 100 may have a structure composed of the structure shown in FIG. 9 and a thin film layer (outer layer) formed on the first counter electrode current collector 150 of the structure shown in FIG. 9.

Such a structure can be produced by, for example, using a first counter electrode current collector 150 produced by the method shown below in the manufacturing process shown in FIG. 8. That is, the power-generating-element producing unit 400 forms a thin film layer containing a fifth material on one surface of a substrate containing a sixth material for the first counter electrode current collector 150. As a result, as shown in FIG. 11, the formed thin film layer functions as the outer layer 152 of the first counter electrode current collector 150. As shown in FIG. 11, the surface on the side on which the thin film layer is not formed of the substrate functions as the inner layer 151 of the first counter electrode current collector 150.

The thin film layer can be formed by, for example, a wet process (e.g., plating), a dry process (e.g., vapor deposition or sputtering), a bonding process (e.g., clad foil molding), or another process (e.g., thermal spraying or coating).

Figure 12:
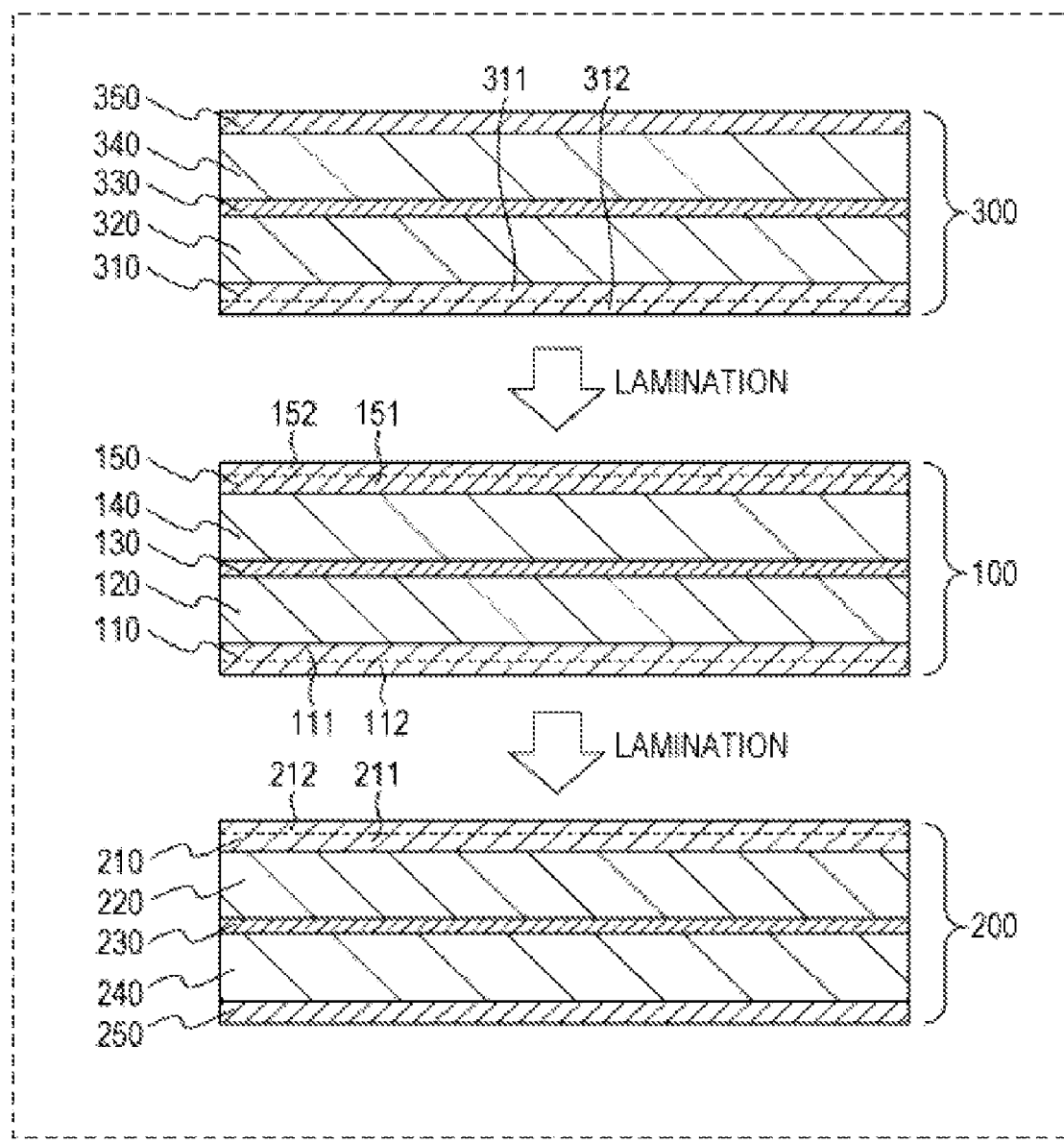
FIG. 12 is cross-sectional views showing a process of laminating a first power generating element, a second power generating element, and a third power generating element.

FIG. 12 is cross-sectional views showing a step of laminating a first power generating element 100, a second power generating element 200, and a third power generating element 300.

As shown in FIG. 12, the laminating unit 500 laminates a first power generating element 100 having the structure shown in FIG. 11 and a second power generating element 200 and a third power generating element 300 each having the structure shown in FIG. 9. For example, the first power generating element 100 is stacked on the second power generating element 200, followed by lamination. On this occasion, the laminating unit 500 arranges the first power generating element 100 and the second power generating element 200 such that the outer layer 112 of the first electrode current collector 110 and the outer layer 212 of the second electrode current collector 210 are in contact with each other. Subsequently, the third power generating element 300 is stacked on the first power generating element 100, followed by lamination. On this occasion, the laminating unit 500 arranges the first power generating element 100 and the third power generating element 300 such that the outer layer 152 of the first counter electrode current collector 150 and the outer layer 312 of the third electrode current collector 310 are in contact with each other.

The method described above can produce, for example, the battery 1100 shown in FIG. 2.

As described above, in Embodiment 2, a group of multiple single battery elements may be arranged in series. That is, single battery elements are stacked such that the positive electrode current collector of a single battery element is brought into contact with the negative electrode current collector of another single battery element to give a series arrangement.

In Embodiment 2, a laminate composed of a plurality of power generating elements may be further pressed (pressure compression). As a result, the series arrangement of the single battery elements can be stabilized. The pressure compression, for example, makes each layer dense and gives a well bonded state.

In Embodiment 2, an adhesive may be partially applied between the positive electrode current collector of one single battery element and the negative electrode current collector of another single battery element. As a result, the series arrangement of the single battery elements can be stabilized. The adhesive may be applied by any method, such as screen printing, die coating, ink jet, dispenser, or another method. The adhesive can be formed into an adhesive layer by pressure compression. Accordingly, the adhesive may be applied in any form of plane, line, or spot.

Figure 13:
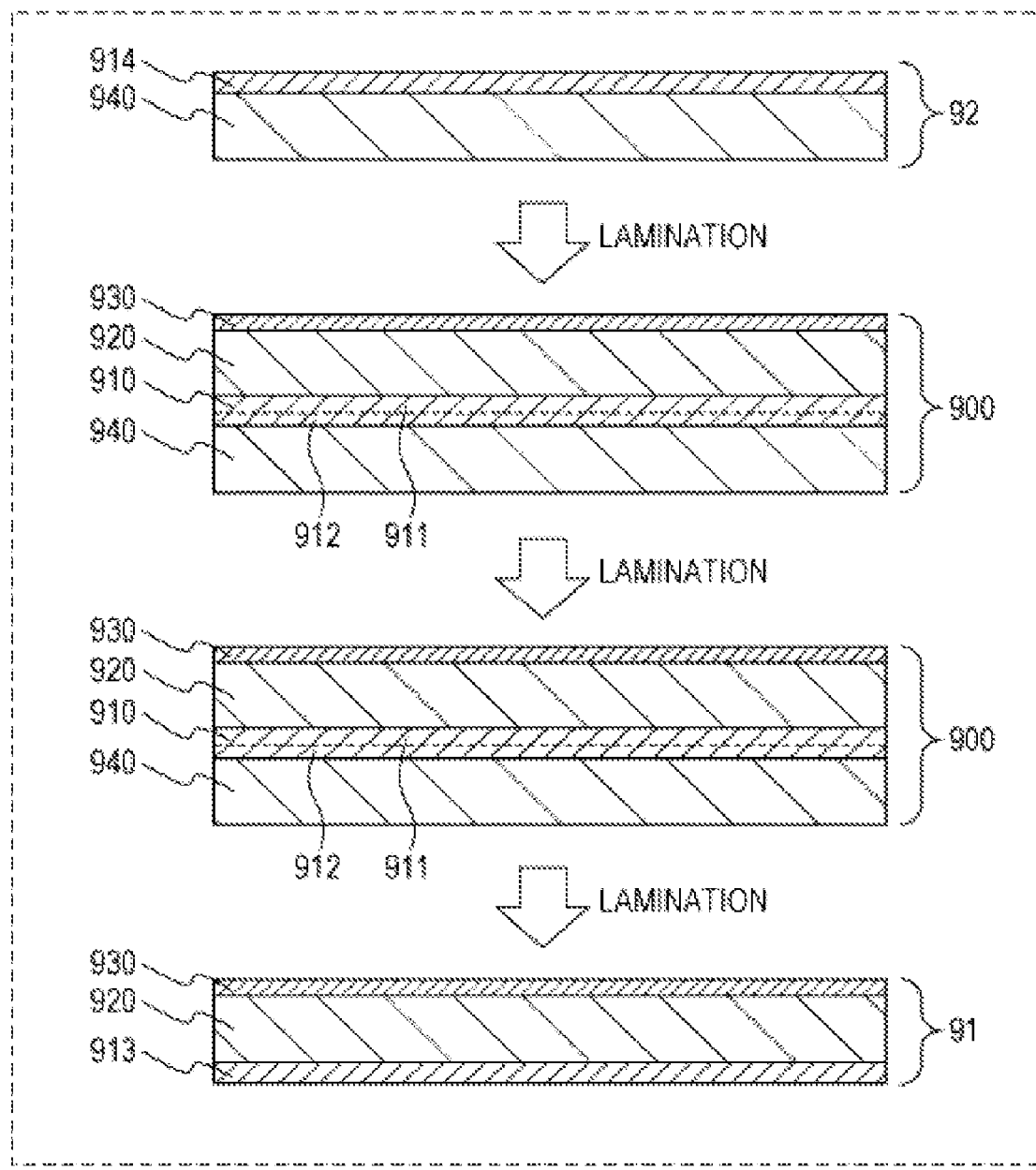
FIG. 13 is cross-sectional views showing a laminating process in a manufacturing method of Comparative Example.

FIG. 13 is cross-sectional views showing a laminating process in a manufacturing method of Comparative Example.

The method in Comparative Example produces a bipolar all-solid-state battery composed of a plurality of bipolar electrode units 900 repeatedly laminated with solid electrolyte layers 930 therebetween.

The bipolar electrode unit 900 includes a composite current collector 910, a positive electrode active material layer 920, a solid electrolyte layer 930, and a negative electrode active material layer 940. One surface 911 of the composite current collector 910 is in contact with the positive electrode active material layer 920. The surface 911 of the composite current collector 910 is, for example, an aluminum layer. Another surface 912 of the composite current collector 910 is in contact with the negative electrode active material layer 940. The surface 912 of the composite current collector 910 is, for example, copper layer.

A positive electrode plate 91 includes a positive electrode current collector 913, a positive electrode active material layer 920, and a solid electrolyte layer 930.

A negative electrode plate 92 includes a negative electrode current collector 914 and a negative electrode active material layer 940.

In the method in Comparative Example, a first bipolar electrode unit 900 is laminated on a positive electrode plate 91; subsequently, a second bipolar electrode unit 900 is laminated on the first bipolar electrode unit 900; and then a negative electrode plate 92 is laminated on the second bipolar electrode unit 900. This lamination is performed such that each of the solid electrolyte layers 930 is in contact with the positive electrode active material layer 920 and the negative electrode active material layer 940. As a result, a bipolar all-solid-state battery having a structure composed of a plurality of bipolar electrode units 900 connected in series is produced.

In the method in Comparative Example, the manufacturing process is complicated and causes a reduction in manufacturing yield. For example, the process of forming active material layers on both surfaces of the composite current collector 910 in the bipolar electrode unit 900 is complicated and may cause a reduction in manufacturing yield. In addition, for example, no current collector is located on the side surfaces of the bipolar electrode unit 900, and the active material layer or the solid electrolyte layer is exposed, resulting in an increase in the risk of causing defects in the active material layer or the solid electrolyte layer when a plurality of bipolar electrode units 900 are laminated.

In contrast, the apparatus or the method in Embodiment 2 can prepare a plurality of power generating elements (single batteries) having current collectors on the side surfaces and can laminate the elements. Accordingly, defects hardly occur in the active material layers and the solid electrolyte layers when the power generating elements (single batteries) are laminated. In addition, the process of producing the power generating elements can be facilitated. Accordingly, as described above, it is possible to produce a battery with an enhanced reliability in connection between power generating elements, while preventing a reduction in manufacturing yield.

In Embodiments 1 and 2, the battery may have a structure composed of a plurality of power generating elements (single battery cells) connected in series. For example, the battery in Embodiment 1 may be a bipolar all-solid-state battery. The bipolar all-solid-state battery has a structure composed of a plurality of single battery elements that are stacked and connected in series, where the single battery elements are each a laminate including a positive electrode active material layer, a solid electrolyte layer, and a negative electrode active material layer tightly adhered to one another between a positive electrode current collector and a negative electrode current collector.

In Embodiments 1 and 2, the battery may include four or more power generating elements. That is, for example, 2 to 200 single battery elements may be laminated to form a laminate-type battery.

In Embodiments 1 and 2, the phrase "a certain layer is mainly composed of a certain material" means, for example, that "a certain layer contains a certain material in an amount of 50 wt % or more based on the total amount of the certain layer". The term "a material mainly composed of a certain material" means, for example, that "a material containing a certain material in an amount of 50 wt % or more based on total amount of the material".

The present disclosure can be suitably utilized as a battery for a variety of electronic apparatus, electrical appliances, and electric vehicles, which are required, for example, to be easy handling and to have high reliability and excellent large current characteristics.

What is claimed is:

1. A battery manufacturing apparatus, comprising:
a coating mechanism;
a transfer mechanism; and
a processor programmed to control the coating mechanism to produce a first power generating element and a second power generating element, wherein
the first power generating element includes a first electrode current collector including an inner layer and an outer layer, a first electrode active material layer, a first solid electrolyte layer, and a first counter electrode active material layer,
the second power generating element includes a second electrode current collector including an inner layer and an outer layer, a second electrode active material layer, a second solid electrolyte layer, and a second counter electrode active material layer and
the processor is further programmed to:
control the transfer mechanism to laminate the first power generating element and the second power generating element produced with the coating mechanism,
control the coating mechanism to form the first solid electrolyte layer between the first electrode active material layer and the first counter electrode active material layer, to form the inner layer of the first electrode current collector in contact with the first electrode active material layer, to form the inner layer of the first electrode current collector from a material containing a first material, and to form the outer layer of the first electrode current collector from a second material different from the first material,
control the coating mechanism to form the second solid electrolyte layer between the second electrode active material layer and the second counter electrode active material layer, to form the inner layer of the second electrode current collector in contact with the second electrode active material layer, to form the inner layer of the second electrode current collector from a material containing a third material different from the first material, and to form the outer layer of the second electrode current collector from the second material, and
control the transfer mechanism to arrange the outer layer of the first electrode current collector and the outer layer of the second electrode current collector in contact with each other.

2. The battery manufacturing apparatus according to claim 1, wherein the processor is further programmed to control the coating mechanism to form the inner layer of the second electrode current collector using the third material, and wherein the third material is a material different from the second material.

3. The battery manufacturing apparatus according to claim 1, wherein the processor is further programmed to control the coating mechanism to form the inner layer of the second electrode current collector using the third material, and wherein the third material is the same material as the second material.

4. The battery manufacturing apparatus according to claim 1, wherein
the processor is further programmed to control the coating mechanism to produce a third power generating element,
the processor is further programmed to control the transfer mechanism to laminate the first power generating element and the third power generating element produced using the coating mechanism,
the first power generating element further includes a first counter electrode current collector including an inner layer and an outer layer,
the third power generating element includes a third electrode current collector including an inner layer and an outer layer, a third electrode active material layer, a third solid electrolyte layer, and a third counter electrode active material layer,
the processor is further programmed to control the coating mechanism to form the third solid electrolyte layer between the third electrode active material layer and the third counter electrode active material layer, to form the inner layer of the third electrode current collector in contact with the third electrode active material layer, to form the inner layer of the third electrode current collector from a material containing a fourth material, and to form the outer layer of the third electrode current collector from a fifth material different from the fourth material,
the processor is further programmed to control the coating mechanism to form the inner layer of the first counter electrode current collector in contact with the first counter electrode active material layer, to form the inner layer of the first counter electrode current collector from a sixth material different from the fourth material, and to form the outer layer of the first counter electrode current collector from the fifth material, and
the processor is further programmed to control the transfer mechanism to arrange the outer layer of the first counter electrode current collector and the outer layer of the third electrode current collector in contact with each other.

5. The battery manufacturing apparatus according to claim 4, wherein the processor is further programmed to control the coating mechanism to form the inner layer of the first counter electrode current collector using the sixth material, wherein the sixth material is a material different from the fifth material.

6. The battery manufacturing apparatus according to claim 4, wherein the processor is further programmed to control the coating mechanism to form the inner layer of the first counter electrode current collector using the sixth material, wherein the sixth material is the same material as the fifth material.

* * * * *